US010094461B2

(12) United States Patent
Gassmann

(10) Patent No.: US 10,094,461 B2
(45) Date of Patent: Oct. 9, 2018

(54) TRANSMISSION ASSEMBLY AND ELECTRIC DRIVE HAVING SUCH A TRANSMISSION ASSEMBLY

(71) Applicant: GKN Automotive Ltd., Redditch, Worcestershire (GB)

(72) Inventor: Theodor Gassmann, Siegburg (DE)

(73) Assignee: GKN Automotive Ltd., Redditch, Worcestershire (GB)

( * ) Notice: Subject to any disclaimer, the term of this patent is extended or adjusted under 35 U.S.C. 154(b) by 0 days.

(21) Appl. No.: 15/556,661

(22) PCT Filed: Mar. 10, 2016

(86) PCT No.: PCT/EP2016/055078
§ 371 (c)(1),
(2) Date: Sep. 8, 2017

(87) PCT Pub. No.: WO2016/142446
PCT Pub. Date: Sep. 15, 2016

(65) Prior Publication Data
US 2018/0051788 A1    Feb. 22, 2018

(30) Foreign Application Priority Data

Mar. 11, 2015   (DE) .......................... 10 2015 103 584

(51) Int. Cl.
*F16H 48/06*       (2006.01)
*F16H 48/40*       (2012.01)
(Continued)

(52) U.S. Cl.
CPC .............. *F16H 48/40* (2013.01); *B60K 1/00* (2013.01); *B62M 11/14* (2013.01); *F16H 48/42* (2013.01);
(Continued)

(58) Field of Classification Search
CPC .......... F16H 48/06; F16H 48/08; F16H 48/38; F16H 48/40; F16H 48/42
See application file for complete search history.

(56) References Cited

U.S. PATENT DOCUMENTS

2011/0230300 A1*   9/2011   Six ......................... F16H 48/36
                                                              475/220
2013/0130857 A1*   5/2013   Gassmann ............... B60K 1/00
                                                              475/150
(Continued)

FOREIGN PATENT DOCUMENTS

DE           1116543 B      11/1961
DE      102005004290 A1     8/2006
(Continued)

OTHER PUBLICATIONS

International Search Report and Written Opinion for PCT/EP2016/055078 dated May 11, 2016 (24 pages; with English translation).

*Primary Examiner* — Edwin A Young
(74) *Attorney, Agent, or Firm* — Bejin Bieneman PLC

(57) ABSTRACT

A transmission assembly for an electric drive for a motor vehicle comprises a first transmission unit having a drive gear and a driven gear; a second transmission unit which is drivingly connected to the first transmission unit and which features a transmission speed reduction ratio i2; a third transmission unit which is drivingly connected to the second transmission unit and which transmits an introduced torque from an input part to two output parts; wherein the second transmission unit comprises a planetary gearing with a planetary gear, a planetary carrier, a first sun gear and a second sun gear, wherein the planetary gear engages the first sun gear and the second sun gear, wherein the first sun gear is at least rotatably supportable relative to a stationary component and wherein the second sun gear is drivingly connected to the input part of the third transmission unit. An (Continued)

electric drive assembly can have such a transmission assembly.

16 Claims, 3 Drawing Sheets

(51) Int. Cl.
  *B60K 1/00* (2006.01)
  *F16H 48/42* (2012.01)
  *B62M 11/14* (2006.01)
  *F16H 48/08* (2006.01)
(52) U.S. Cl.
  CPC ........ *B60K 2001/001* (2013.01); *F16H 48/08* (2013.01); *F16H 2048/405* (2013.01); *F16H 2200/2005* (2013.01)

(56) References Cited

U.S. PATENT DOCUMENTS

| | | | |
|---|---|---|---|
| 2013/0190124 A1* | 7/2013 | Gassmann | B60K 1/00 475/150 |
| 2014/0274528 A1 | 9/2014 | Valente et al. | |

FOREIGN PATENT DOCUMENTS

| | | |
|---|---|---|
| DE | 112006001851 T5 | 5/2008 |
| DE | 102010054533 A1 | 6/2012 |
| DE | 102011004698 A1 | 12/2012 |
| DE | 112010005738 T5 | 6/2013 |
| EP | 2593323 A1 | 5/2013 |
| EP | 2772665 A1 | 9/2014 |
| WO | 2012007031 A1 | 1/2012 |
| WO | 2013120594 A1 | 8/2013 |

* cited by examiner

TRANSMISSION ASSEMBLY AND ELECTRIC DRIVE HAVING SUCH A TRANSMISSION ASSEMBLY

CROSS-REFERENCE TO RELATED APPLICATIONS

This application is a national stage of, and claims priority to, Patent Cooperation Treaty Application No. PCT/EP2016/055078, filed on Mar. 10, 2016, which application claims priority to German Application No. DE 10 2015 103 584.7, filed on Mar. 11, 2015, which applications are each hereby incorporated herein by reference in their entireties.

FIELD

The present disclosure relates to a transmission assembly, in particular for an electric drive for a motor vehicle, and an electric drive having such a transmission assembly. The electric drive can serve as the only drive for the motor vehicle or an internal combustion engine can be provided in addition. In this case the electric drive and the internal combustion engine can drive the motor vehicle either individually or jointly superimposing one another. Drive concepts including an internal combustion and an electric drive are also referred to as hybrid drives.

BACKGROUND

Normally, an electric drive comprises an electric machine (i.e., electric motor) as well as a subsequent reduction gearing that translates a rotational movement from fast to slow. The reduction gearing transfers the torque to the driveline of the motor vehicle. For this, a differential gearing arranged downstream the reduction gearing in the power path splits up the introduced torque to the two output shafts for driving the vehicle wheels. The two output shafts of the differential gearing have a compensating effect relative to each other, i.e. if one of the two output shafts rotates faster, the other output shaft rotates correspondingly slower and vice versa.

From WO 2012 007031 A1 an electric drive for a motor vehicle is known, which electric drive comprises an electric motor and a transmission unit. The transmission unit comprises a planetary gearing and a differential gearing which are arranged coaxially relative to one another. There is provided a manual clutch which can be transferred into three switching positions, i.e., two different switching positions and one idling position.

From DE 11 2006 001 851 T5 an auxiliary drive assembly for a motor vehicle is known. Said drive assembly comprises an electric motor, a planetary reduction gearing and a differential gearing which are arranged coaxially relative to one another. The planetary gearing comprises a carrier which is driven by the electric motor, and a plurality of flange shafts which are connected to the carrier and which each freely rotatably carry pairs of first and second planetary gears firmly connected to each other. The first planetary gears have a smaller diameter than the second planetary gears and engage the teeth of a stationary sun gear. The second planetary gears engage larger planetary gears which are rotatably supported on further flange shafts connected to the carrier. The larger planetary gears engage the second sun gear which is connected so as to be rotationally fixed to the differential cage of the differential gearing.

DE 11 2010 005 738 T5 proposes an electric drive having an electric motor, a traction drive, a planetary gearing and a differential gearing. The driving axle of the electric motor and the rotational axis of the differential gearing are offset relative to each other.

From De 10 2011 004 698 A1 an electric drive is known having an electric motor, a planetary gearing and a differential gearing which are arranged coaxially relative to one another.

From DE 1 116 543 A an axle unit is known having its own driving motor and a differential gearing.

From DE 10 2010 054 533 A1 a transmission is known having a reduction portion and a differential portion. The reduction portion comprises two planetary stages. The differential portion is configured as a spur gear differential.

From DE 10 2005 004 290 A1 a transmission module is known for variably distributing torque in the driveline of a motor vehicle. The transmission module comprises a first shaft having a first sun gear, a second shaft having a second sun gear, a plurality of planetary gears which engage the first sun gear and the second sun gear and a carrier element carrying the planetary gears. By means of a clutch, the carrier element can be connected to a stationary housing, so that torque is transmitted between the first and the second shaft.

In the case of drive concepts comprising an electric drive, currently there is a development trend towards electric machines with higher rotational speeds, which, in turn, requires the use of higher transmission ratios of a subsequent reduction gearing. Such transmission ratios cannot necessarily be achieved by a two-stage spur gear transmission. At the same time, higher rotational speeds of the electric drives intensify the risk of an undesirable NVH (noise, vibration, and harshness) behaviour and greater splashing losses in the transmission. According to a common understanding, NVH behaviour includes an oscillation which is audible as a noise and/or sensible as vibration and which is usually undesirable.

SUMMARY

Disclosed herein is a transmission assembly, in particular for an electric drive for driving a motor vehicle, which transmission assembly comprises a high transmission ratio, an advantageous NVH behaviour, low performance losses and a compact design. Included in this disclosure is a suitable electric drive having such a transmission assembly.

A transmission assembly, in particular for an electric drive for a motor vehicle, comprises a first transmission unit having a drive gear and a driven gear which are axially offset relative to each other; a second transmission unit which is drivingly connected to the first transmission unit and which features a transmission speed reduction ratio; a third transmission unit which is drivingly connected to the second transmission unit and which distributes an introduced torque from an input part to two output parts; wherein the second transmission unit comprises a planetary gearing with at least one planetary gear, a planetary carrier which carries the at least one planetary gear, a first sun gear and a second sun gear, wherein the planetary carrier is rotatingly drivable by the first transmission unit around a rotational axis, wherein the at least one planetary gear engages the first sun gear and the second sun gear at least indirectly, wherein the first sun gear is at least rotationally supportable relative to a stationary component, and wherein the second sun gear is drivingly connected to the input part of the third transmission unit.

An advantage of the transmission assembly is that large transmission speed reduction ratios can be achieved. To help achieve this, the first transmission unit and the second transmission unit are arranged functionally in series and a specific configuration of the second transmission unit with a planetary gearing and two sun gears is provided. A further advantage is that splashing or churning losses are kept low and that an advantageous NVH behaviour can be achieved.

A torque introduced into the transmission assembly by a drive source is transmitted by the first transmission unit to the second transmission unit and from there to the third transmission unit, where it is distributed to the two output shafts. In the power path defined in this way, individual components of the transmission assembly are drivingly connected to other components for transmitting torque. The expressions "rotatingly drivable" or "drivingly connected" according to the present disclosure shall include the possibility that between a driving component and a component driven by same, one or more further components can be incorporated in the power path. For example, in the power path between the first transmission unit and the third transmission unit, it is possible to incorporate a further transmission unit in addition to the second transmission unit. It is also possible that a controllable clutch is arranged in the power path between two drivingly connected components, which controllable clutch—depending on requirements—can optionally effect or interrupt a transmission of torque.

The first sun gear is at least rotationally supportable relative to a stationary component, which shall include in particular that the first sun gear is permanently held in a rotationally fixed way, or optionally supportable in a rotationally fixed way, for example by a controllable clutch. Stationary components can be all those components which are suitable for providing a rotationally fixed support such as a housing part of the transmission assembly or a component connected to the housing. The planetary gearing comprises at least one planetary gear, wherein it is to be understood that also two, three or more planetary gears can be provided which can be uniformly circumferentially distributed. If in the present disclosure reference is made to one, or to the planetary, gear, such reference should always be understood in terms of at least one planetary gear. The at least one planetary gear engages the first and, respectively, the second sun gear at least indirectly. This shall include the possibilities of a direct and an indirect toothed engagement, for example via a further intermediate gear.

The first transmission unit is configured in particular such that an axial offset is formed between a drive gear and a driven gear of the transmission unit. It is thus possible to bridge an axial offset between a rotational axis A1 of the drive source and the rotational axis A2 of the second and respectively third transmission unit. For the transmission of the transmission unit, in particular one of the following applies: the first transmission unit is configured to translate an introduced torque with a first transmission ratio of one to maximally three; and/or the second transmission unit is configured to translate an introduced torque to reduced speed with a second transmission ratio of maximally ten; and/or that a total transmission ratio which is composed of the first transmission ratio and the second transmission ratio is between ten and thirty. By this configuration, the transmission assembly is advantageously suitable for being used in electric drives with high-speed electric machines. The first transmission unit can comprise a transmission ratio of one between the drive gear and the driven gear, wherein in this case the drive gear and the driven gear rotate at identical speeds around rotational axis which are axially offset relative to one other. Alternatively, the first transmission unit can also be configured for gearing down the drive gear relative to the driven gear.

The first transmission unit can comprise a drive gear with a first rotational axis and a driven gear with a second rotational axis which are drivingly connected to one another, wherein the drive gear can be arranged coaxially relative to the planetary carrier and connected to the planetary carrier in a rotationally fixed way. In an embodiment, the first transmission unit can be configured in form of a chain drive or belt drive, for example, wherein the drive gear and the driven gear—in this case—are drivingly connected via a chain or a belt, or they can be drivingly connected to one another in the form of a spur gearing, wherein the gears are then drivingly connected to one another by engaging teeth.

The planetary gearing forms the second transmission unit which transmits a rotational movement for further speed reduction. A torque introduced into the planetary carrier is transmitted to the at least one planetary gear which is connected to the planetary carrier such that with a planetary gear axis it rotates around the rotational axis of the planetary carrier. It is proposed that a planetary gear comprises a first toothed portion which is drivingly connected to the first sun gear, and a second toothed portion which is drivingly connected to the second sun gear. In each case, the connection can be effected directly via a direct meshing engagement of the respective toothed portion with the respective sun gear, or indirectly for instance by interposing a further planetary gear. It is proposed that the first sun gear is connected, or is connectable so as to be rotationally fixed to the stationary component. The second sun gear can be connected to the input part of the third transmission unit in a rotationally fixed way. A rotationally fixed connection can be a form-locking, a force-locking and/or a material-locking connection, for example.

According to a possible embodiment, the first toothed portion and the second toothed portion of the planetary gear comprise the same number of teeth. For example, the first toothed portion and the second toothed portion can be configured in the same way. The first sun gear and the second sun gear, however, can comprise different numbers of teeth, wherein the teeth of the first sun gear and the teeth of the second sun gear have a profile displacement relative to one another. A transmission is achieved by the different numbers of teeth and by the profile displacement respectively. The two gears and the at least one planetary gear comprise the same module. The number of teeth of the first sun gear and of the second sun can be selected such that in a relative rotational position of the first sun gear and of the second sun gear, several teeth axially overlap one another so that they are able to engage the teeth of several planetary gears simultaneously.

According to an embodiment, the third transmission unit comprises a differential gearing or rather is configured as such, wherein the input part of the differential gearing is provided in the form of a differential cage which is arranged coaxially relative to the axis of rotation of the planetary carrier.

There are several possibilities for arranging the transmission units. According to a first embodiment, the planetary gearing is arranged at least partially radially outside and/or with a partially radial overlap relative to the third transmission unit. For example, it can be provided that the at least one planetary gear and the differential cage at least partially axially overlap, wherein the second sun gear can be connected to a casing portion of the differential cage. In this case, the sun gear can comprise a larger diameter than a greatest outer diameter of the differential cage. The connection of the second sun gear with the differential cage can be effected force-lockingly, for example, by bolted connections, form-lockingly for example by engaging teeth and/or material-lockingly for example by a welded connection. It is also possible that the second sun gear and the planetary carrier are produced in one piece.

According to a second embodiment, the planetary gearing is arranged so as to be arranged at least partially radially inside, and/or axially adjoining, the third transmission unit. In particular it can be proposed that the at least one planetary gear comprises a radial overlap with the differential carrier. In this case, the second sun gear can comprise a smaller diameter than a greatest diameter of the differential cage.

It applies to both embodiments that the planetary carrier of the planetary gearing is configured to be housing-like, wherein the third transmission unit can be arranged in the planetary carrier. More particularly, the housing-like planetary carrier can be filled with a lubricant and sealed towards the outside relative to a housing interior. It is further possible that the planetary carrier comprises a sleeve projection by means of which the planetary carrier is supported on one side in a stationary housing of the transmission assembly. This means that the planetary carrier, with reference to a central plane that intersects the planetary gears, is supported on only one side in the stationary housing. Such a unilateral support, which can also be referred to as a cantilevered support, can comprise for example two axially spaced rolling contact bearings. An advantage of a unilateral support is that, on its side opposed to the support, the stationary housing can be made of a lightweight material such as plastic or sheet metal which only needs to have a sealing function but not a load bearing function. On the other hand, the carrying part of the stationary housing in which the bearing for the planetary carrier is provided can include a higher-strength material such as aluminium cast.

Further disclosed is an electric drive for a motor vehicle, comprising: an electric machine with a driveshaft for driving a driving axle of the motor vehicle, and a transmission assembly which can be configured according to at least one of the above-mentioned embodiments. The first transmission stage of the transmission assembly is drivingly connected to the driveshaft of the electric machine.

The electric drive assembly has the same advantages as the transmission assembly, e.g., high achievable speed reduction transmission ratios, which makes it possible to use a high-speed electric machine as the drive source. According to an embodiment, the electric machine is a high-speed electric machine with a nominal rotational speed of at least 20,000 revolutions per minute. The drive gear of the first transmission stage can be arranged coaxially relative to the driveshaft of the electric machine and/or connected thereto in a rotationally fixed way.

SUMMARY OF THE DRAWINGS

Examples will be explained below with reference to the drawings wherein.

DETAILED DESCRIPTION

Figure 1:
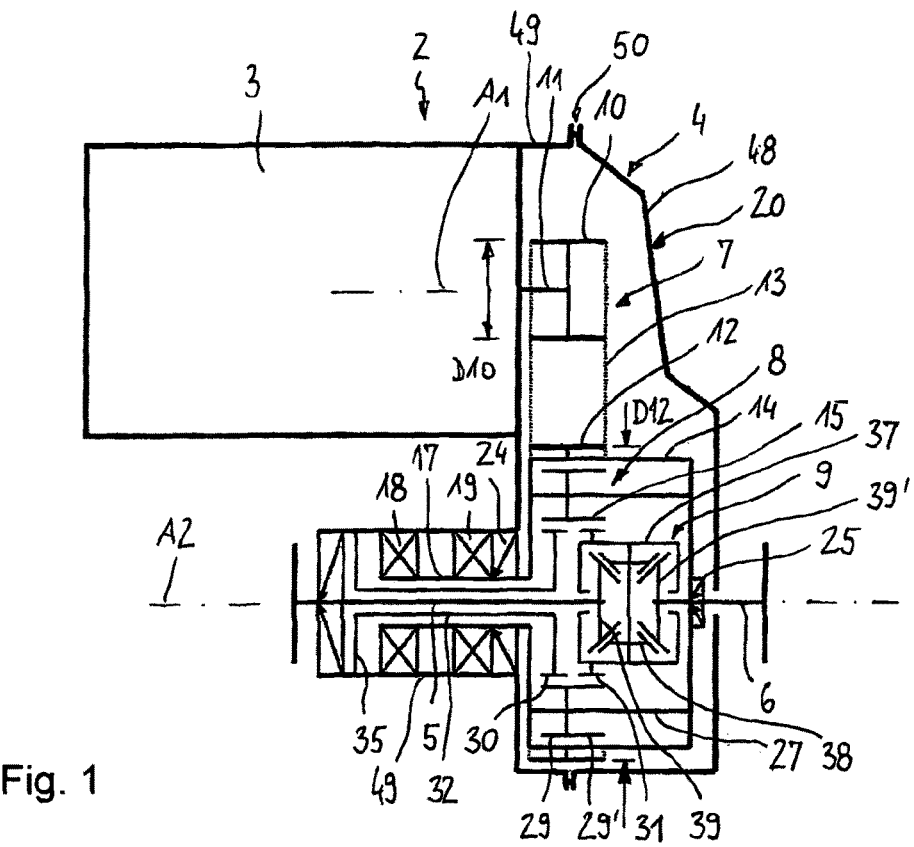
FIG. 1 shows schematically an example electric drive assembly having a transmission assembly in a first embodiment.
Figure 2:
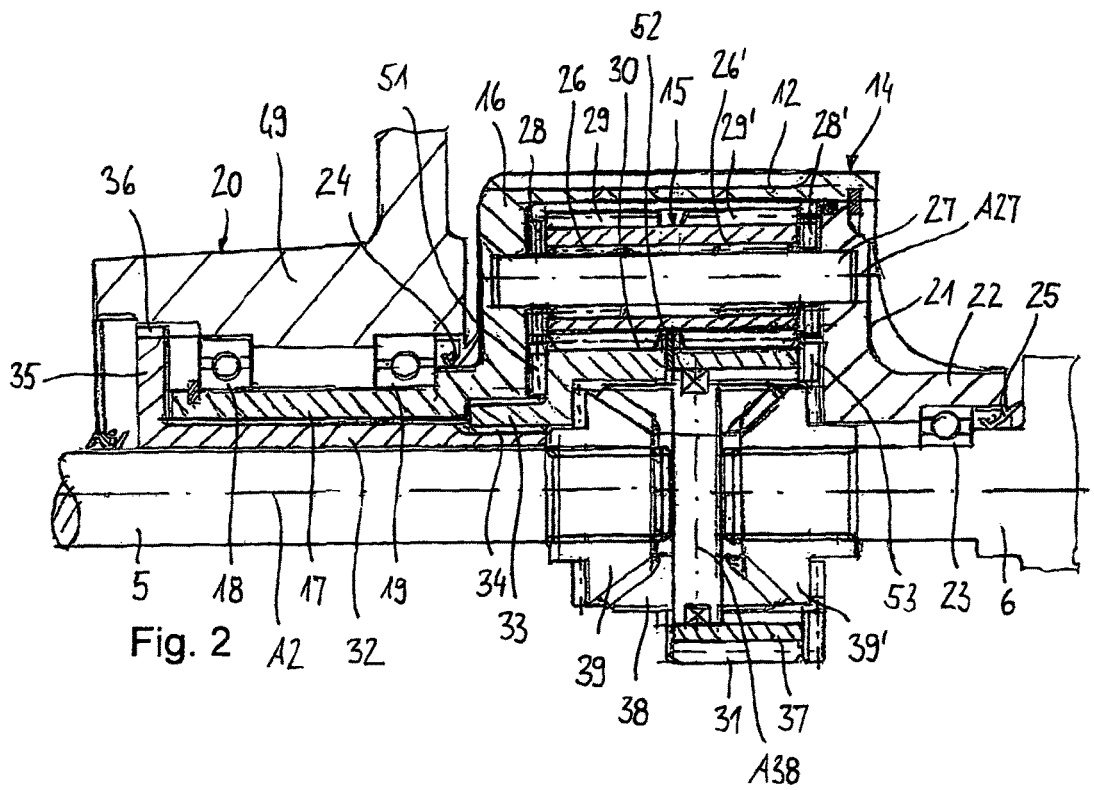
FIG. 2 shows a detail of the transmission assembly according to FIG. 1 in half a longitudinal section.

FIGS. 1 and 2 will be described jointly below. FIG. 1 shows an example electric drive assembly 2 having an electric machine 3 and an example transmission assembly 4 in a first embodiment. The transmission assembly 4 comprises a first transmission unit 7, a second transmission unit 8 and a third transmission unit 9. The second and the third transmission units 8, 9 are shown in detail in FIG. 2. The third transmission unit 9 is provided in the form of a differential gearing which distributes a torque introduced by the second transmission unit 8 to two output shafts 5, 6.

The electric machine (i.e., motor) 3 serves as drive source for driving a driving axle of the motor vehicle (not shown). The electric machine 3 is controlled by an electronic control unit (ECU). For being supplied with current, the electric machine has to be connected to a battery (not shown). The electric machine 3 can be configured in particular as a high-speed electric motor and, for example, it can comprise a nominal rotational speed of at least 20,000 revolutions per minute (r.p.m.). Normally, an electric machine comprises a stator which is firmly connected to a motor housing, as well as a rotor which is firmly connected to a motor shaft 11 for torque transmitting purposes.

From the motor shaft 11 torque is introduced into the first transmission unit 7. The first transmission unit 7 comprises a belt drive with a drive gear 10 and a driven gear 12 which are drivingly connected to one another via an infinite belt 13. The drive gear 10 is firmly connected to the motor shaft 11 and coaxially arranged relative thereto. It can be seen that the driven gear 12 comprises a much greater diameter than the drive gear 10, which means that a transmission speed reduction is effected. The first transmission radio i1 which corresponds to the diameter D12 of the driven gear 12 to the diameter D10 of the drive gear 10 (i1=D12/D10) is greater than one and preferably amounts to a maximum of three, i.e. $1 \leq i1 \leq 3$. As an alternative to the embodiment comprising a belt drive, the first transmission unit 7 can also be provided in the form of a chain drive or spur gear drive. In all these cases, the transmission unit 7 bridges an axial offset between the rotational axis A1 of the electric machine 3 and the rotational axis A2 of the second and respectively third transmission unit 8, 9.

The second transmission unit 8 is provided in the form of a planetary gearing which transmits a rotational movement introduced by the driven gear 12 of the first transmission unit for speed reduction. The driven gear 12 of the first transmission unit 7 is firmly connected to a planetary carrier 14 of the planetary gearing 8, which planetary carrier 14 is rotatingly drivable via the belt drive around the rotational axis A2. The planetary gearing 8 comprises a plurality of planetary gears 15 which are fixed to the planetary carrier 14 so as to rotate around the rotational axis A2 of the planetary carrier 14. The planetary carrier 14 is housing-like and comprises a cup-shaped housing part 16 with a sleeve projection 17 which is supported by bearings 18, 19 in the housing 20 of the transmission assembly 4 so as to rotate around the rotational axis A2, as well as a cover-shaped housing part 21 with a sleeve projection 22 which is rotatingly supported by a bearing 23 on the output shaft 6 of the third transmission unit 9. On the side of the second sleeve projection 22, the planetary carrier 14 is unsupported relative to the stationary housing 20, i.e., the planetary carrier 14 is supported only on one side by the first sleeve projection 17 in the housing 20. This one-sided or cantilever support of the planetary carrier allows the stationary housing 20 to comprise a supporting housing portion 49 produced out of a high-strength and high-stiffness material, in which the planetary carrier 14 is supported and which serves to connect a drive source, as well as a non-supporting portion 48 produced out of material with a reduced strength and reduced stiffness which serves only to seal the housing interior. The two housing portions 48, 49 are connected to one another by suitable connecting means 50, for instance a bolted or welded flange connection. An annular chamber formed between the first housing part 16 and the stationary housing 20 is sealed by a shaft seal 24 which is arranged so as to adjoin the bearing 19. An annular chamber formed between the second housing part 21 and the output shaft 6 is sealed by a shaft seal 25 which adjoins the bearing 23.

By means of radial bearings 26, 26', the planetary gears 15 are each supported on a journal 27 connected to the planetary carrier 14 so as to be rotatable around a journal axis A27 and are axially supported by axial bearings 28, 28' relative to the planetary carrier 14. The planetary gears 15 each comprise a first toothed portion 29 which engages the first sun gear 30 as well as a second toothed portion 29' which engages the second sun gear 31. The first sun gear 30 is connected to the stationary housing 30 in a rotationally fixed way via an intermediate sleeve 32 which is arranged coaxially relative to the rotational axis A2 radially between the first output shaft 5 of the third transmission unit 9 and the sleeve projection 17 of the planetary carrier 14 and extends axially beyond one end of the sleeve projection 17. In an embodiment it is possible that the first sun gear 30 comprises a sleeve-shaped connecting portion 33 which is connected to the sleeve 32 in a rotationally fixed way by splines. At its opposite end, the sleeve 32 comprises a flange portion 35 which, via teeth 36, is connected to the stationary housing 20 in a rotationally fixed way. As a result of the rotationally fixed connection of the sun gear 30 to the stationary housing 30, a torque introduced into the sun gear 30 can be supported against the stationary housing 20. For supporting axial forces, a stop disc 51 is arranged between the sun gear 30 and the housing part 16.

It is possible that the first and the second toothed portion 29, 29' of the planetary gears 15 each comprise the same number of teeth and, more particularly, are equally formed. In contrast, the first sun gear 30 and the second sun gear 31 have different numbers of teeth, with the teeth of the first sun gear 30 and the teeth of the second sun gear 31 being profile-displaced relative to one another. The two sun gears 30, 31 and the toothed portions 29, 29' of the planetary gears 15 comprise the same module. The different numbers of teeth and the displacement of the profiles of the sun gears 30, 31 effects a translation. The numbers of the teeth of the first and of the second sun gears 30, 31 are selected such that in a relative position of rotation, several teeth overlap so that they can simultaneously engage the teeth of several planetary gears 15.

The second sun gear 31 is connected to the input part 37 of the differential gearing 9 for driving same. The input part 37 is provided in the form of a differential cage which is drivable by the second sun gear 31 so as to rotate around the axis of rotation A2. The second sun gear 31 and the differential cage 37 are firmly connected to one another, for example they are welded to one another or produced in one piece. The second sun gear 31 is axially supported on the planetary carrier 14 and on the sun gear 30 by axial bearings 52, 53. In the present embodiment, the planetary gearing 8 is arranged radially outside and partially axially overlapping the differential gearing 9. The second sun gear 31 is provided on the outside of a casing portion of the differential cage 37, so that the planetary gears 15 and the differential cage 37 partially axially overlap.

The differential gearing 9 comprises a plurality of differential gears 38 which are rotatably supported in the differential cage 37 so as to rotate on rotational axes A38 and which jointly rotate with the differential cage 37 around the rotational axis A2, as well as two sideshaft gears 39, 39' which are each coaxially arranged so as to be rotatable around the axis of rotation A2 and meshingly engage the differential gears 38. The torque introduced into the differential carrier 37 is transmitted via the differential gears 38 to the two sideshaft gars 39, 39', wherein a compensating effect exists between the two sideshaft gears. The sideshaft gears 39, 39' are in turn, to transmit torque connected in a rotationally fixed way via splines to the associated sideshafts 5, 6 which transmit the introduced torque to the wheels of the motor vehicle.

By the present embodiment of the second transmission stage 8, the rotational movement introduced by the first transmission stage 7 is further geared down. The second transmission ratio i2 of the second transmission stage is greater than one, in particular greater than five and can reach a maximum of 10, i.e. $1 \le i2 \le 10$. In total, the transmission ratio iges which is composed of the first transmission ratio i1 and the second transmission ratio i2 (iges=i1·i2) can amount to between ten and fifteen. This means that the differential cage 37 rotates between ten to fifteen times slower than the driveshaft 11 of the electric motor 3. In the present embodiment which has a belt drive as the first transmission unit 7, the interior of the stationary housing 20 can be dry, i.e., there is no need for any lubrication. Only the rotatingly drivable housing-like planetary carrier 14 which in this respect can also be referred to as a planetary housing, is filled with a lubricant, so that the rotating components of the planetary gearing 8 and of the differential gearing 9 are lubricated and cooled. In this way it is possible to keep any splashing losses low.

Figure 3:
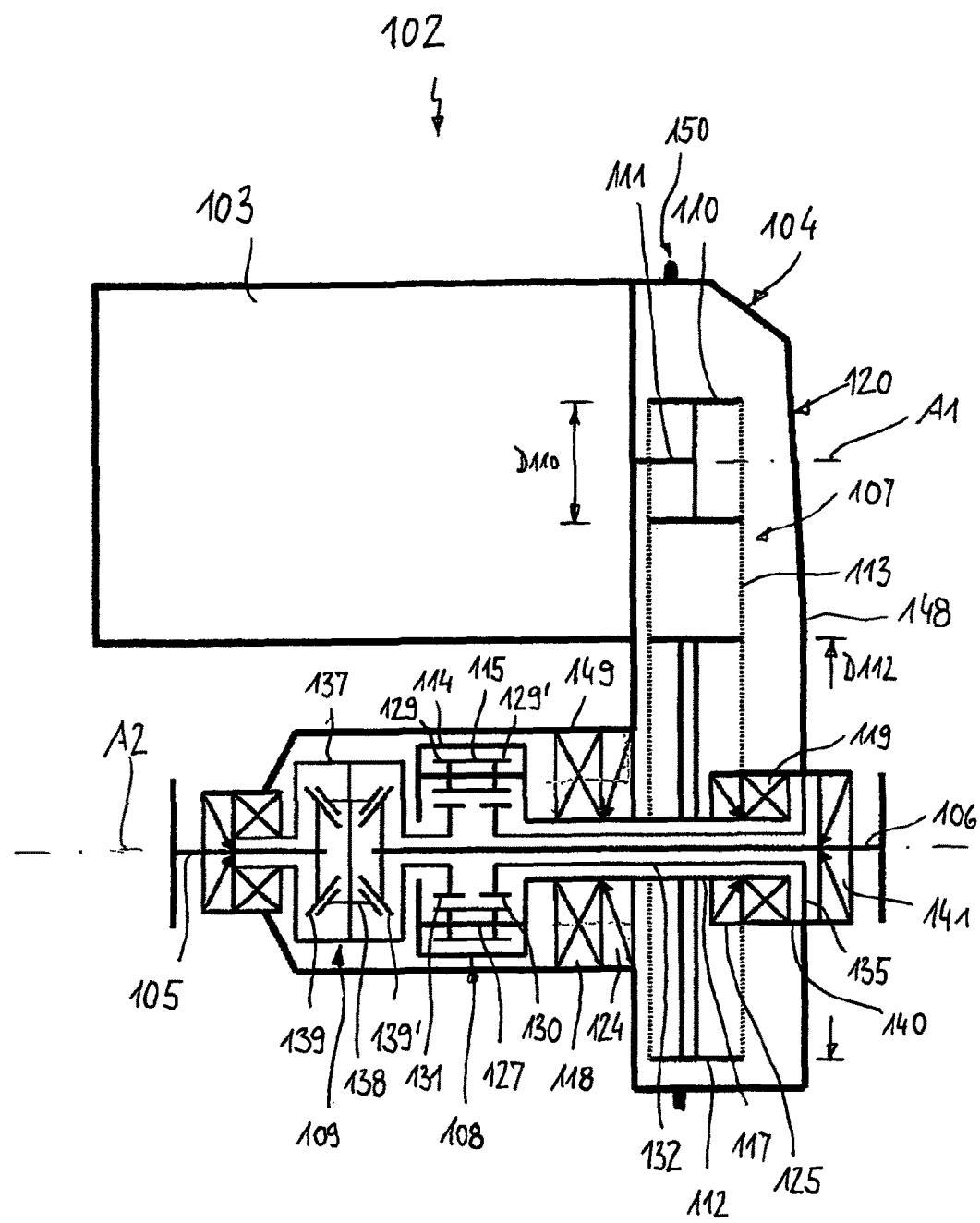
FIG. 3 shows schematically an example electric drive assembly having a transmission assembly in a second embodiment.
Figure 4:
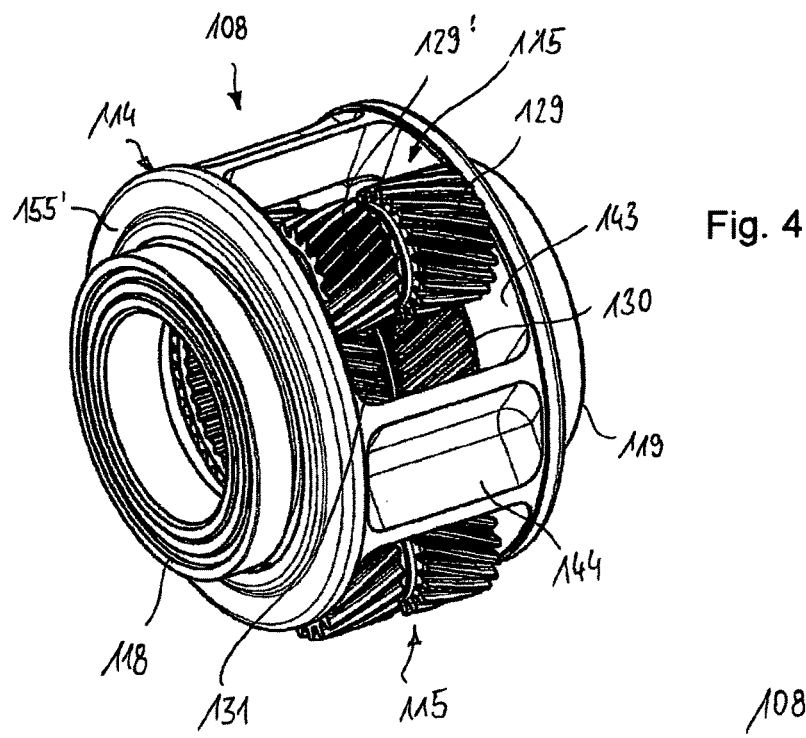
FIG. 4 shows a second transmission unit of the transmission assembly of FIG. 3 in a perspective view, partially in section.
Figure 5:
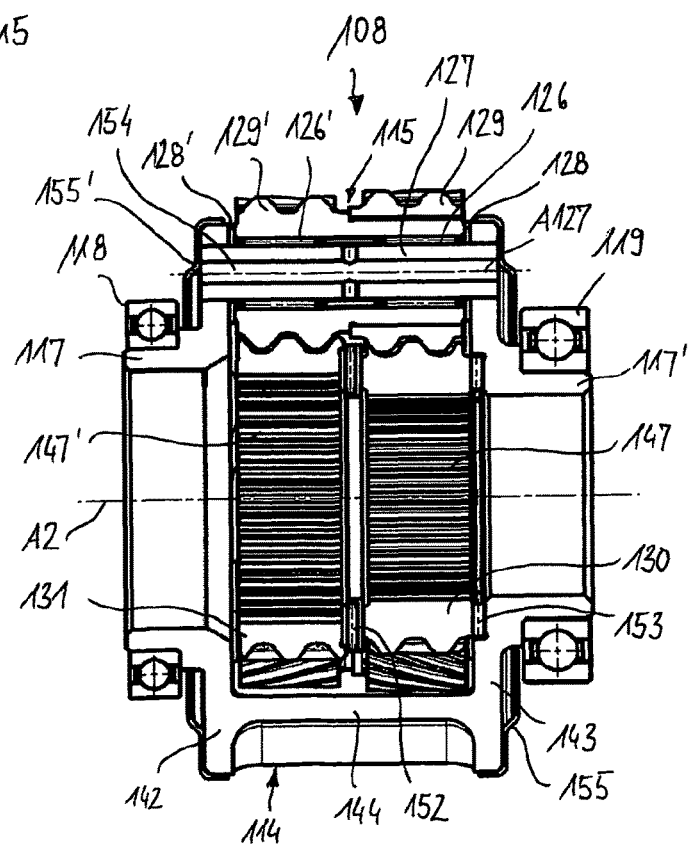
FIG. 5 shows the second transmission unit according to FIG. 4 in a longitudinal section.

FIG. 3 shows an example electric drive 102 having an electric machine 103 and an example transmission assembly 104 in a second embodiment. The electric drive 102 and, respectively, the transmission assembly 104 largely correspond to those according to FIGS. 1 and 2, so that with respect to any common features reference is made to the above description. Any details which correspond to one another have been given reference numbers which are increased by 100 relative to FIGS. 1 and 2. As in the above-described embodiment, the present embodiment 104, too, comprises a first transmission unit 107, a second transmission unit 108 and a third transmission unit 109. The second transmission unit 108, which is configured as a planetary gearing, is shown in detail in FIGS. 4 and 5. FIGS. 3 to 5 will be described jointly below.

A special feature of the second embodiment is that the second and the third transmission units 108, 109 are axially offset relative to one another and relative to the first transmission unit 107, which will be explained below.

The electric machine 103 has the same features as the above embodiment and to avoid repetition, reference is hereby made to same. The motor shaft 111 introduces torque into the first transmission unit 107, which is provided in the form of a belt drive, but can also be provided in the form of a chain drive or spur gear drive. The drive gear 110 is firmly connected to the motor shaft 111 and arranged coaxially relative thereto. The driven gear 112 comprises a substantially larger diameter than the drive gear 110, so that a transmission speed reduction is effected. The first transmission ratio i1 (i1=D112/D110 is greater than one and can amount to a maximum of three, i.e. 1≤i1≤3.

The driven gear 112 of the first transmission unit 107 is connected in a rotationally fixed way to the planetary carrier 114 of the second transmission unit 108. For this purpose, the driven gear 112 is connected to a hollow shaft 117 which transmits the introduced torque to the planetary carrier 114 of the second transmission unit 108. The first portion of the hollow shaft 117, which is positioned on the one side of the driven gear 112, is supported by a first bearing 118 in the stationary housing 120 so as to be rotatable around the rotational axis A2. The annular chamber formed between the housing 120 and the hollow shaft 117 is sealed by a first seal 124. The second portion of the hollow shaft 117, which is positioned on the other side of the driven gear 112, is supported by a second bearing 119 in a bearing bush 140 of the stationary housing so as to be rotatable around the rotational axis A2. The annular chamber formed between the bearing bush 140 and the second portion of the hollow shaft 117 is sealed by a second seal 125. The output shaft 106 is sealed relative to the housing 120 by a seal 141.

The second transmission unit 108 is provided in the form of a planetary gearing which transmits the rotational movement introduced into the planetary carrier 114 for speed reduction.

The planetary gearing 108 comprises a plurality of planetary gears 115 which are connected to the planetary carrier 114 so as to rotate around the rotational axis A2. The planetary carrier 114 can be configured to be housing-like and comprise a cup-shaped housing part 116 in which the planetary gears 115 and the sun gears 130, 131 are received, or it is cage-like, as described below.

The planetary gearing 108 is shown as a detail in FIGS. 4 and 5. It can be seen that the planetary gears 115 are each rotatably supported by radial bearings 126, 126' on a journal 127 connected to the planetary carrier 114 around a respective journal axis A127, and they are axially supported by axial bearings 128, 128' relative to side walls of the planetary carrier 114. The journals 127 comprise lubricant channels 154 through which the lubricant can flow for lubricating the bearings 126, 126'. The planetary carrier 114 is cage-shaped and comprises a first flange part 142, a second flange part 143 and a plurality of axially extending web parts 144 which connect the first and the second flange part 142, 142' to each other. The planetary carrier 114 can be produced in one piece and the gears 115, 130, 131 can be mounted through the openings formed between the webs 144. Covers 155, 155' are placed onto the flange parts 142, 143.

The planetary gears 115 are produced in two parts and each comprise a first toothed portion 129 which engages the first sun gear 130, and a second toothed portion 129' which engages the second sun gear 131. The two toothed portions 129, 129' are first produced as separate parts and are subsequently firmly connected to one another, for example by welding. However, in principle it is also possible to produce the planetary gears in one part. The first sun gear 130 is connected to the stationary housing 120 in a rotationally fixed way via an elongated sleeve 132. The sleeve 132 is arranged coaxially relative to the rotational axis A2 and radially between the second output shaft 106 and the hollow shaft 117, and extends in the axial direction as far as the housing bush 140 of the stationary housing. The first sun gear 130 and the second sun gear 131 each comprise inner teeth 147, 147' to provide a rotationally fixed connection with corresponding outer teeth of the respective part to be connected. The first sun gear 130 is connected to the outer teeth of the sleeve 132 in a rotationally fixed way, whereas the second sun gear 131 is connected in a rotationally fixed way to the outer teeth of an insertable part connected to the planetary carrier. At its end opposed to the planetary gearing 108, the sleeve 132 comprises a flange portion 135 which, for example, via teeth, is connected to the stationary housing 120 in a rotationally fixed way. As a result of the rotationally fixed connection of the first sun gear 130 to the stationary housing 120, a torque introduced into the sun gear 130 is supported against the stationary housing 120.

The present embodiment according to FIGS. 4 and 5 is modified relative to the above embodiment in that the first and the second toothed portion 129, 129' of the planetary gears 115 comprise different numbers of teeth. As can be seen in particular in FIG. 4, the toothed portions 129, 129' comprise different configurations. For example, it is possible that the toothed portion 129 is slid on to a sleeve projection of the toothed portion 129' and fixedly connected thereto, in particular welded or pressed on. The first sun gear 130 and the second sun gear 131 have different numbers of teeth. The two sun gears 130, 131 and the toothed portions 129, 129' of the planetary gears 115 can comprise the same module. As a result of the different numbers of teeth of the two toothed portions 129, 129' of the planetary gears a transmission is effected, wherein a greater flexibility in respect of the transmission conditions is achieved relative to an embodiment where the toothed portions comprise the same number of teeth. However, it is understood that the present embodiment according to FIGS. 3 to 5 can also be provided with the same number of teeth of the toothed portions of the planetary gears and vice versa in that the above embodiment according to FIGS. 1 and 2 can be provided with toothed portions with different numbers of teeth.

The second sun gear 131 is connected to the input part 137 of the differential gearing 109 for driving same. The input part 137 is configured in the form of a differential cage which is drivable by the second sun gear 131 so as to rotate around the rotational axis A2. A special feature of the present embodiment is in that the planetary gearing 106 is arranged so as to axially adjoin the differential gearing 109 and at least partially radially overlap with same. The second sun gear 131 comprises a smaller diameter than the differential cage 127 of the differential gearing 109.

The differential gearing 109 is configured like the first embodiment above, to which reference is hereby made to avoid repetition. Torque introduced into the differential cage 137 by the sun gear 131 is transmitted via the differential gears 138 to the two sideshaft gears 139, 139'. The sideshaft gears 139, 139' are connected to the associated sideshafts 105, 106 which transmit the torque as introduced to the wheels of the motor vehicle.

By the present embodiment of the second transmission stage 108, the rotational movement introduced by the first transmission stage 107 is transmitted to reduce speed. The second transmission ratio i2 of the second transmission stage 108 is greater than one, more particularly greater than five, and can amount to a maximum of 10, i.e. 1≤i2≤10. In total, the transmission ratio iges, which is composed of the first transmission ratio i1 and the second transmission ratio i2 (iges=i1·i2) can amount to between ten and fifteen. This means that the differential cage 137 rotates between ten and fifteen times more slowly than the driveshaft 111 of the electric motor 103. The interior of the housing portion 148, in which the belt drive 107 is accommodated, is dry, which means it is lubricant-free. In contrast thereto, the housing portion 149, in which the planetary gearing 108 and the differential gearing 109 are accommodated, is filled with a lubricant for cooling and lubricating the rotating parts. In the present embodiment, both housing portions 148, 149, as load bearing portions, are produced from a suitable high-strength housing material, for example a cast material.

The above-described embodiments of the transmission assemblies 4, 104 are advantageous in that they allow high achievable transmission speed reduction ratios, which permits the use of high-speed electric machines as the drive source. By using a belt drive as the first transmission unit, this part can remain without lubricant, so that, overall, churning or splashing loses can be kept low. The inventive transmission assemblies 4, 104 can be used in an electric drive assembly 2, 102 for driving a vehicle driving axle.

The invention claimed is:

1. A transmission assembly for an electric drive for a motor vehicle, comprising:
   a first transmission unit having a drive gear and a driven gear between which an axial offset is provided;
   a second transmission unit which is drivingly connected to the first transmission unit and which features a gearing down transmission ratio;
   a third transmission unit which is drivingly connected to the second transmission unit and which transmits an introduced torque from an input part to two output parts;
   wherein the second transmission unit comprises a planetary gearing with at least one planetary gear, a planetary carrier which carries the at least one planetary gear, a first sun gear and a second sun gear,
   wherein the planetary carrier is rotatingly drivable by the first transmission unit around a rotational axis,
   wherein the at least one planetary gear engages the first sun gear and the second sun gear at least indirectly,
   wherein the first sun gear is at least supportable relative to a stationary component in direction of rotation, and
   wherein the second sun gear is drivingly connected to the input part of the third transmission unit.

2. The transmission assembly of claim 1, wherein at least one of the following applies:
   the first transmission unit is configured for translating an introduced torque with a first transmission ratio of a maximum of three;
   the second transmission unit is configured for gearing down an introduced torque with a second transmission ratio with a maximum of ten; and
   a total transmission ratio (iges) which is composed of the first transmission ratio and the second transmission ratio ranges between ten and thirty.

3. The transmission assembly of claim 1,
   wherein the drive gear of the first transmission unit is rotatingly drivable around a first rotational axis, and the planetary carrier is rotatable around a second rotational axis, wherein the driven gear of the first transmission unit is arranged coaxially relative to the second rotational axis and connected to the planetary carrier in a rotationally fixed way, wherein the second rotational axis extends at a distance from and parallel to the first rotational axis.

4. The transmission assembly of claim 1,
   wherein the first sun gear is connected to the stationary component in a rotationally fixed way and the second sun gear is connected to the input part of the third transmission unit in a rotationally fixed way.

5. The transmission assembly of claim 1,
   wherein the at least one planetary gear comprises a first toothed portion which engages the first sun gear and a second toothed portion which engages the second sun gear.

6. The transmission assembly of claim 5,
   wherein the first toothed portion and the second toothed portion comprise the same number of teeth, wherein the first toothed portion and the second toothed portion are configured to be identical.

7. The transmission assembly of claim 1,
   wherein the first sun gear and the second sun gear comprise a different number of teeth, wherein the teeth of the first sun gear and the teeth of the second sun gear are profile-displaced relative to one another.

8. The transmission assembly of claim 1,
   wherein the number of teeth of the first sun gear and of the second sun gear are selected such that in a relative rotational position of the first sun gear relative to the second sun gear, several teeth axially overlap each other, so that they can simultaneously engage the teeth of several planetary gears.

9. The transmission assembly of claim 1,
   wherein the third transmission unit comprises a differential gearing, wherein the input part of the third transmission unit is configured as a differential cage which is arranged coaxially relative to the rotational axis of the planetary carrier.

10. The transmission assembly of claim 1,
    wherein the planetary carrier of the planetary gearing comprises a sleeve projection for supporting the planetary carrier on one side in a stationary housing.

11. The transmission assembly of claim 1,
    wherein the third transmission unit comprises a differential gearing with a differential cage, wherein the at least one planetary gear and the differential cage at least partially axially overlap, wherein the second sun gear is connected to a cylindrical portion of the differential cage.

12. The transmission assembly of claim 11,
    wherein the third transmission unit is arranged in the planetary carrier.

13. The transmission assembly of claim 11,
    wherein the planetary gearing is arranged so as to axially adjoin the differential gearing, wherein the second sun gear comprises a smaller diameter than the differential cage.

14. An electric drive for a motor vehicle, comprising:
    an electric machine comprising a driveshaft for driving a driving axle of the motor vehicle, and
    a transmission assembly, comprising:
       a first transmission unit having a drive gear and a driven gear between which an axial offset is provided;
       a second transmission unit which is drivingly connected to the first transmission unit and which features a gearing down transmission ratio;
       a third transmission unit which is drivingly connected to the second transmission unit and which transmits an introduced torque from an input part to two output parts;
       wherein the second transmission unit comprises a planetary gearing with at least one planetary gear, a planetary carrier which carries the at least one planetary gear, a first sun gear and a second sun gear,
       wherein the planetary carrier is rotatingly drivable by the first transmission unit around a rotational axis,
       wherein the at least one planetary gear engages the first sun gear and the second sun gear at least indirectly, wherein the first sun gear is at least supportable relative to a stationary component in direction of rotation, wherein the second sun gear is drivingly connected to the input part of the third transmission unit, and wherein the first transmission unit of the transmission assembly is drivingly connected to the driveshaft of the electric machine.

15. The electric drive of claim 14, wherein the electric machine is configured as a high-speed electric motor with a nominal rotational speed of at least 20,000 revolutions per minute.

16. The electric drive of claim 14, wherein the drive gear of the first transmission unit is arranged coaxially relative to the driveshaft of the electric machine.

* * * * *